Sept. 20, 1927.

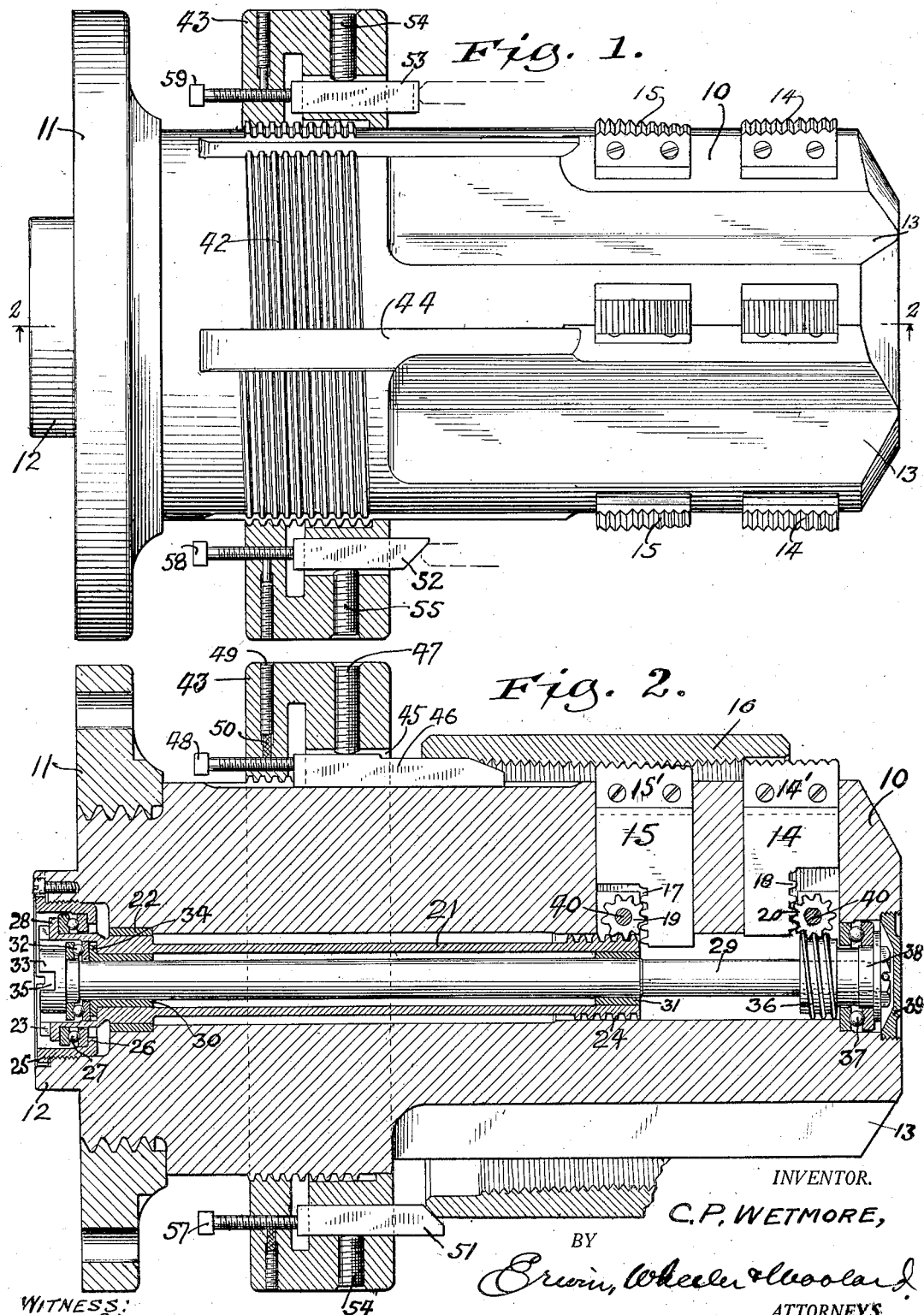

C. P. WETMORE 1,643,264

COLLAPSIBLE THREADING TAP

Filed Dec. 29, 1924

INVENTOR.
C. P. WETMORE,
BY
ATTORNEYS.

WITNESS:

Patented Sept. 20, 1927.

1,643,264

UNITED STATES PATENT OFFICE.

CHARLES P. WETMORE, OF MILWAUKEE, WISCONSIN, ASSIGNOR TO A. O. SMITH CORPORATION, OF MILWAUKEE, WISCONSIN, A CORPORATION OF NEW YORK.

COLLAPSIBLE THREADING TAP.

Application filed December 29, 1924. Serial No. 758,609.

The present invention relates to an improvement upon the collapsible threading tap, the purposes of which are fully disclosed in my prior application Serial No. 669,704, filed October 20, 1923, and it resides in a simplification of the construction of the invention, whereby the results desired are attained in a structure subject to a more economical manufacture and assembly. The use for which the present invention is particularly designed is that of threading pipe couplings having a bore which tapers from each end to the middle.

The structural features embodied in the present invention will now be specifically described, and the novelty thereof will be pointed out in the appended claims.

In the drawings herewith:

Fig. 1 is a view in side elevation showing a tapping tool constructed in accordance with my invention, the adjustable ring which holds the end finishing tools being shown in central cross section for the purpose of more clearly indicating the arrangement of some of such tools.

Fig. 2 is a longitudinal vertical section of the tool shown in Fig. 1, the view being taken on the line 2—2, Figs. 1 and 3, and showing in addition thereto in section a coupling blank as undergoing treatment by my improved invention.

Figure 3:
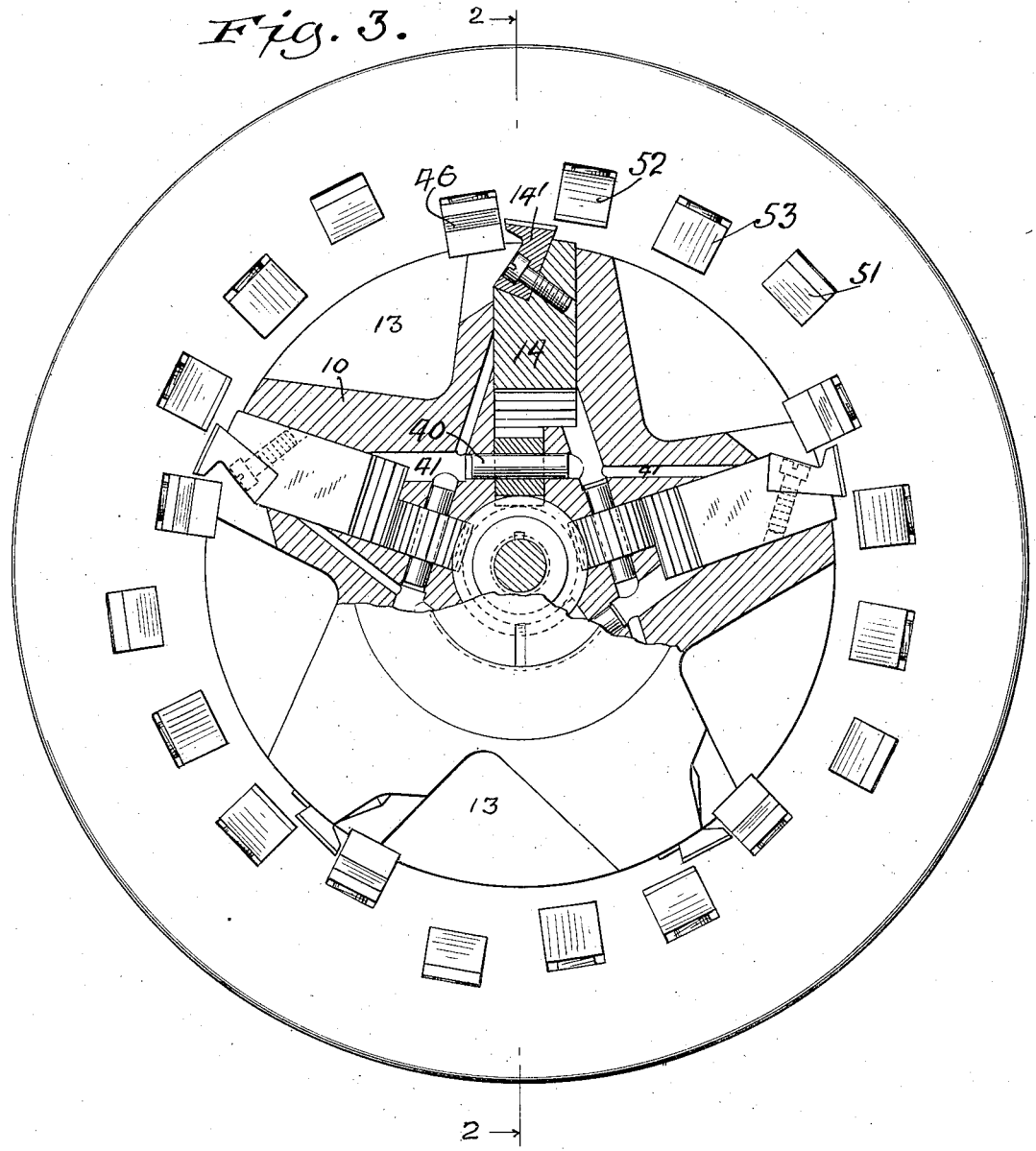
Fig. 3 is an enlarged view in end elevation of the tapping tool, partly broken out to show the arrangement of some of the elements.

Referring to the drawings, the numeral 10 designates the head of my improved tapping tool, the rear end of which is threaded and shouldered to receive thereon a circular disc or flanged plate 11, by means of which the tapping tool may be secured in fixed relation to the rotating spindle of a lathe or drill press, in case the work to be operated on is held against rotation by a chuck, or to a fixed stand in such lathe or press, in case a movement of rotation is imparted to the work. The said head is also provided at its rear end with a reduced circular projection 12, by means of which it is accurately centered with relation to the part to which it is attached.

The head 10 is provided with a central axial bore leading therethrough from end to end, and from such bore near the front or unattached end of the head, a plurality of equally spaced radially arranged openings extend outwardly to the periphery of the head. I have aligned the said radial openings in two longitudinally or axially spaced circumferential series or rows, each embracing five such openings for reasons of more efficient and accurate operation. Five thread chasers compose a set, one thread chaser being disposed in each of the equally spaced radial openings in each such circumferential series. The head 10 is provided intermediate the chasers with longitudinally extending surface channels 13 upon its forward or free end, for the accommodation of the chips which are cut from the work in the operation of the chasers. Two sets of thread chasers, a leader set 14 and a follower set 15, are operated in the radial openings in the head, one set of such chasers being arranged in each of the circumferential rows of openings, as will be understood from what is shown in the drawings and herein described.

The thread chasers comprised in both sets are formed at one end with teeth to cut threads of the same pitch upon the double tapering interior surface of the coupling 16, and their longitudinal or axial spacing in the two circumferential rows of radial openings in the head is so exact that the threads cut by the chasers 15 of the follower set in the rear end of the coupling blank will lead exactly and merge into the threads cut by the chasers 14 in the forward end of the coupling by the leader set, so that continuous threads of the same pitch are formed in the bore of the coupling blank, tapering from one end to the other. It is extremely desirable for many reasons that such threads be continuous, and that there be no perceptible joining line at the middle of the coupling between the threads cut by one set of chasers and those cut by the other, and this result is readily achieved by spacing as described, and accurately positioning the cutting teeth of the chasers.

In the tapping head disclosed in my said former application, the chasers are provided upon their opposite longitudinal edges with rack teeth, which are engaged by pinions, two for each chaser, so that in the joint rotation of each pair of the pinions, radial movements are imparted to the chasers. In the present invention, I have simplified the construction of the chasers as by cutting away a square or rectangular section at one inside corner for about one-half of the width of the chasers and forming the rack teeth 17 and 18 upon the longitudinal transverse central line of the chasers, so that the outward thrust exerted by the pinions 19 and 20 operating singly and engaging such rack teeth will be applied centrally and be distributed equally upon the said chasers as they are guided for movement in the radial openings, and hold them accurately up to the work.

A tubular shaft 21 is mounted for rotation in the central axial bore of the head 10, and is supported at the rear or attached end of the head by a wear resisting bushing 22, set in a shouldered enlargement of the said bore. The said shaft 21 at its rear end is provided with a clutch face 23, by means of which a movement of rotation may be imparted thereto. The forward end of the tubular shaft 21 carries a worm 24 which is in mesh with the pinions 19 of the several chasers comprising the follower set 15, so as to impart radial movement to such chasers in the rotation of the shaft 21. The circular projection 12 at the rear end of the head 10 is bored out to form an enlarged recess, which is concentric with the central bore in the head, and in such recess is threaded a cup 25 having an inturned circular step 26, against which rests a ball race 27, confined in the said cup by a flange or ring 28 formed exteriorly upon the expanded rear end of the tubular shaft 21.

A second shaft 29 is journaled in the tubular shaft 21, and is supported in wear resisting bushings 30 and 31, disposed within the said tubular shaft, a ball race 32 being located between the enlarged end 33 of the shaft 29 and a flange 34 formed upon the bushing 30, the flange 34 resting upon a step formed in the expanded rear end of the tubular shaft 21. The shaft 29 is provided at its rear end with a clutch face 35, by means of which movements of rotation are imparted to the said shaft.

The other end of the shaft 29, extending outwardly from the tubular shaft 21, is provided with a worm 36 in mesh with the pinions 20 of the leader set of chasers 14, so as to impart radial movements thereto in the rotation of the shaft 29. A ball race 37 is located in an enlargement of the central bore at the outer unsupported end of the head 10, such ball race being confined by means of a nut 38, which may be adjusted and secured upon the adjacent end of the shaft 29. A plug 39 is threaded into the opening at the end of the head 10, to retain the parts in their assembled position. It will be observed that the ball races are arranged so as to take the longitudinal inward thrusts upon the shafts when the thread chasers 14 are actuated radially outward, and the chasers 15 are permitted to move radially inward, during the rotation of their respective shafts, in the performance of the thread cutting operations. It is preferable that the shafts be rotated in the same direction, both in their forward and reverse movements.

The pinions 19 and 20 are arranged one each at the bottom of the several radial openings in the head 10, such pinions being free to revolve upon short shafts 40, set in bores formed transversely of the head. In order to provide for the convenient insertion of the said short shafts to support the pinions, I drill through-openings 41 transversely of the head, such openings having varying diameters to enable the short shaft 40 to be passed freely through one radial opening and receive a driving fit in the formation of the next one, the bore being continued through and leading into a third one of the radial openings, so that by inserting a drift in the end of the latter, the shaft 40 may be removed when desirable, this arrangement being illustrated in Fig. 3. The shouldered or offset construction at the bottom of the radial openings in the head 10, is adopted to form a support for and permit the free movement of the pinion shafts 40 past each other, so that one may be withdrawn without disturbing the adjacent ones.

The thread chasers 14 and 15 may be formed as integral parts, or in the interest of economy they may be formed in two parts as shown in Figs. 1 and 2, the cutting edges 14¹ and 15¹ being replaceable as they become worn out or unserviceable, as by constant use.

Near its rear end, the head 10 is threaded as at 42 for the reception of an end finishing tool carrying ring 43, the threaded connection being provided for the purpose of facilitating and determining exactly the longitudinal adjustment of the said tool carrying ring with relation to the thread chasers. The head 10 is provided upon its outer surface with a plurality of longitudinal channels 44, formed after the manner of key seats, and the ring is provided interiorly with axially extending grooves 45, forming co-operating companion seats. Upon adjustment of the ring 43 to the desired position by rotation along the head 10, with the channels and grooves 44 and 45 in register, a counter-boring tool 46 is inserted in the seat thus formed, and serves to lock and hold the ring firmly against further rotation upon the head. The counter-sunk screw 47 in the ring 43, serves to bind the counter-boring tool 46 in the position in which it has been placed. But when the ring 43 has been set in the desired position, the longitudinal position of the counter-boring tool 44, with reference to the coupling 16, may be more accurately adjusted by means of a set screw 48 threaded into the ring 43, such set screw bearing against the rear end of the tool 46, and being held against accidental rotation by means of a counter-sunk screw 49, threaded radially into the ring 43, and pressing a softer metal plug 50 against the threads of the screw 48, to avoid damage to the latter.

In addition to the arrangement of the counter-boring tools as described, I provide the ring 43 with tools 51 for cutting away the outer corner of the coupling 16, with tools 52 for cutting away the inner corner of the coupling, and with tools 53 for squaring or finishing the end of the coupling. The said end finishing tools 51, 52 and 53 are arranged in sockets formed axially in the ring 43, and are secured in adjusted position by means of counter-sunk radial screws 54, 55 and 56, the longitudinal adjustment of the said tools being effected and maintained through set screws 57, 58 and 59, respectively, which set screws are held against accidental rotation by the employment of means comprising a softer metal locking plug like that above described in connection with the positioning of the counter-boring tools 46.

As before stated, the tapping head 10 may be either stationary or mounted so as to rotate during the performance of its work, and, correspondingly, the pipe coupling blank 16 may be held either in a fixed or a rotatable chuck. The shafts 21 and 29 are independently and reversibly rotatable at varying speeds. The speeds at which the leader chasers 14 are advanced and the follower chasers 15 permitted to recede during the threading operations, will be proportioned to the angularity of the tapering bores.

At the commencement of the threading operation, the coupling blank 16 and the tapping head 10 have a relative movement toward each other, so that the tap upon entering the bore of the coupling blank positions the set of leader chasers 14 at the middle of the coupling blank, while the follower chasers of the set 15 are positioned at the rear end thereof. In the feeding movement of the tapping head with relation to the work after the positioning has been effected, the leader chasers 14 are caused to engage the inside of the coupling blank at its constricted central portion by the rotation of the shaft 29. In the further rotation of the shaft, the said chasers 14 are caused to move radially outward at a rate which is commensurate with the increasing enlargement of the tapering bore at the outer end of the coupling, and so cut the threads of uniform depth upon such tapering surface. At the same time, the chasers 15 of the follower set are caused to engage in the bore at the rear end of the coupling blank, and inasmuch as the diameter of the tapering bore in that end of the coupling blank decreases, the chasers are permitted by the rotation of the shaft 21 to recede at a proportionate rate until the constricted central portion of the coupling is reached, at which time the threads cut by the follower chaser 15 will be merged into the threads previously cut by the leader chaser 14 at such constricted central portion. As the threading operation nears completion, the counter-boring tools 46 are operating upon the rear end of the coupling blank, and at the conclusion of the threading operation, the several tools 51, 52 and 53 are brought into operation to finish the adjacent end of the coupling, in the manner hereinbefore set forth. The quick reverse rotation of the shaft 21 at the conclusion of the threading operations, will serve to withdraw the teeth of the thread chasers 14 from their engagement with the threads cut in the outer end of the coupling, and a further continued rotation of the shaft 29 in the same direction will clear the teeth of the chasers 15 from their engagement with the threads cut in the inner end of the coupling, so that by a relative radial transverse of the head and the coupling, the tool may speedily be withdrawn from the work to permit removal of the latter. The coupling thus threaded and finished at one end in the expeditious and economical manner described, needs only the slight operations of the counter-boring and finishing its other end in order to be a completed article.

Having thus described my invention, what I claim and desire to secure by Letters Patent of the United States, is:

1. In a collapsible threading tap, the combination of a head provided with a central axial bore and a plurality of radially extending openings leading therefrom, thread chasers disposed one in each radial opening, the thread chasers being each provided with a single row of rack teeth, a shaft mounted for rotation in the central bore of the head, and pinions engaging the racks and rotated by the shaft to impart movement to the several chasers.

2. In a collapsible threading tap, the combination of a head provided with a central axial bore and a plurality of radially extending openings leading therefrom, thread chasers disposed one in each radial opening, the thread chasers each being provided with rack teeth at approximately its longitudinal center line, a shaft mounted for rotation in the central bore of the head, and pinions engaging the racks and rotated by the shaft to impart radial movements to the several chasers.

3. In a collapsible threading tap, the combination of a head provided with a central axial bore and a plurality of radially extending openings leading therefrom, thread chasers disposed one in each radial opening, the thread chasers each being provided with a single row of rack teeth at approximately its longitudinal center line, a shaft mounted for rotation in the central bore of the head and carrying a worm, and pinions between the worm and the racks, whereby the several chasers are moved radially in the rotation of the shaft by pressure exerted at their longitudinal centers.

4. In a collapsible threading tap, the combination of a head provided with a central axial bore and radially extending openings arranged in two circumferential rows leading therefrom, thread chasers in sets disposed in the said openings, the chasers being each provided at approximately its longitudinal center line with rack teeth, a shaft mounted for rotation in the bore of the head and carrying a worm, pinions between the worm and the racks of one set of chasers, a second shaft likewise mounted and provided with a worm, and pinions between such worm and the racks of the other set of chasers, whereby the several chasers are actuated longitudinally by pressure exerted at their centers.

5. A chaser provided upon one end with teeth for cutting threads and having one side thereof cut away to its approximate longitudinal center line and provided in such line with a single row of rack teeth, in combination with a pinion engaging the said rack to actuate the chaser longitudinally by pressure exerted at its center line in the rotation of the pinion.

6. A chaser provided upon one end with teeth for cutting threads and having one side thereof cut away to its approximate longitudinal center line and provided in such line with a single row of rack teeth, whereby the chaser may be actuated longitudinally by the engagement of a pinion with the rack.

In testimony whereof, I have signed my name at Milwaukee, this 26th day of December, 1924.

CHARLES P. WETMORE.